(12) United States Patent
Ryu et al.

(10) Patent No.: US 12,191,748 B2
(45) Date of Patent: Jan. 7, 2025

(54) VIBRATION MOTOR

(71) Applicant: JAHWA ELECTRONICS CO., LTD., Cheongju-si (KR)

(72) Inventors: Jong Soo Ryu, Cheongju-si (KR); Hyun Gyu Sung, Cheongju-si (KR); Jung Hoon Jang, Cheongju-si (KR); Jun Ki Lee, Bucheon-si (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 0 days.

(21) Appl. No.: 18/568,807

(22) PCT Filed: Aug. 5, 2022

(86) PCT No.: PCT/KR2022/011682
§ 371 (c)(1),
(2) Date: Dec. 9, 2023

(87) PCT Pub. No.: WO2023/033387
PCT Pub. Date: Mar. 9, 2023

(65) Prior Publication Data
US 2024/0275237 A1 Aug. 15, 2024

(30) Foreign Application Priority Data

Aug. 31, 2021 (KR) .......................... 10-2021-0115678

(51) Int. Cl.
*H02K 7/06* (2006.01)
*H02K 3/26* (2006.01)
(Continued)

(52) U.S. Cl.
CPC .............. *H02K 7/063* (2013.01); *H02K 3/26* (2013.01); *H02K 5/1737* (2013.01); *H02K 7/086* (2013.01); *H02K 21/24* (2013.01); *H02K 2203/03* (2013.01)

(58) Field of Classification Search
CPC ...... H02K 21/24; H02K 2203/03; H02K 3/26; H02K 5/1737; H02K 7/063; H02K 7/086;
(Continued)

(56) References Cited

U.S. PATENT DOCUMENTS

| 7,157,822 B2 * | 1/2007 | Yoshida ................. H02K 7/063 310/89 |
| 2005/0116557 A1 * | 6/2005 | Rojo Lulic ............. F16C 35/06 310/90 |
| 2015/0236563 A1 * | 8/2015 | Yamaguchi ............ H02K 7/063 310/81 |

FOREIGN PATENT DOCUMENTS

| KR | 100861610 B1 | 10/2008 |
| KR | 20170016692 A | 2/2017 |

(Continued)

*Primary Examiner* — Naishadh N Desai
(74) *Attorney, Agent, or Firm* — Bayramoglu Law Offices LLC

(57) ABSTRACT

A vibration motor is provided. The vibration motor comprises: a rotor shaft; a first magnet and a second magnet arranged on the rotor shaft so as to face each other; a circuit board having a hollow hole through which the rotor shaft passes and coils arranged thereon, the coils respectively facing the first and second magnets; a housing forming an inner space in which the rotor shaft and the circuit board are mounted; a shaft passing through the rotor shaft and fixedly erected in the housing; a first yoke and a second yoke on which the first and second magnets are respectively installed and which are fixedly coupled to the rotor shaft so as to integrally rotate along with the rotor shaft; a weight installed on the first yoke or the second yoke; and a bearing portion comprising a plurality of bearings coaxially arranged with the shaft.

9 Claims, 7 Drawing Sheets

(51) Int. Cl.
*H02K 5/173* (2006.01)
*H02K 7/08* (2006.01)
*H02K 21/24* (2006.01)

(58) Field of Classification Search
CPC ............ H02K 5/16; H02K 5/167; H02K 7/00; H02K 7/06; H01L 21/76264; H01L 21/76281; H01L 27/1203
See application file for complete search history.

(56) References Cited

FOREIGN PATENT DOCUMENTS

| | | |
|---|---|---|
| KR | 20180089692 A | 8/2018 |
| KR | 102144680 B1 | 8/2020 |

* cited by examiner

VIBRATION MOTOR

CROSS REFERENCE TO THE RELATED APPLICATIONS

This application is the national phase entry of International Application No. PCT/KR2022/011682, filed on Aug. 5, 2022, which is based upon and claims priority to Korean Patent Application No. 10-2021-0115678, filed on Aug. 31, 2021, the entire contents of which are incorporated herein by reference.

TECHNICAL FIELD

The present invention relates to a vibration motor, and more specifically to an eccentric rotary vibration motor.

BACKGROUND

Recently, as vibration motors have been manufactured in a thinner size, they are applied to various fields such as haptic seats or haptic touch screens of vehicles, home and office chairs, massagers, beds, sleeping pillows or the like, thereby providing users with convenience such as massage and alert or alarm.

In particular, the dustproof/waterproof high-vibration motor that can be used in construction sites with a lot of dust and noisy surroundings or underwater, such as skin scuba diving, provides a vibration alert or alarm function to users in dangerous work environments or hobbies, thereby enabling safe work and hobbies.

In order to effectively meet the needs of various users, it is necessary to develop high-vibration/long-lifespan vibration motors with reliability and durability in terms of performance.

However, since the vibration motor disclosed in Korean Registered Patent No. 10-2144680 is configured such that the shaft disposed at the center of rotation is directly rotated, there is a problem in that reliability is deteriorated due to fretting that occurs between the shaft and the ball bearing in contact therewith. In addition, due to structural characteristics, the ball bearing is placed inside the middle supporter (shaft supporter) so as to support the rotating shaft, and a separate bearing housing is required to fix an outer ring of the ball bearing, and thus, there is a limitation to the expansion of the specifications of the ball bearing. In addition, since a separate bearing for supporting the rotating middle supporter must be disposed on an upper side of the middle supporter, the structure of the bearing is somewhat complicated, and it is difficult to reduce the thickness of the vibration motor.

SUMMARY

Technical Problem

The present invention has been devised in consideration of the above points, and an object of the present invention is to provide a vibration motor that can be reduced in thickness.

Another object of the present invention is to provide a vibration motor having durability and reliability such that sufficient performance can be implemented under various usage environments.

In addition, still another object of the present invention is to provide a vibration motor which is capable of expanding bearing specifications.

Technical Solution

In order to achieve the above-described objects, according to an aspect of the present invention, provide is a vibration motor, including a rotor shaft; a first magnet and a second magnet arranged on the rotor shaft so as to face each other; a circuit board having a hollow hole through which the rotor shaft passes and coils arranged thereon, the coils respectively facing the first and second magnets; a housing forming an inner space in which the rotor shaft and the circuit board are mounted; a shaft passing through the rotor shaft and fixedly erected in the housing; a first yoke and a second yoke on which the first and second magnets are respectively installed and which are fixedly coupled to the rotor shaft so as to integrally rotate along with the rotor shaft; a weight installed on the first yoke or the second yoke; and a bearing portion comprising a plurality of bearings coaxially arranged with the shaft, at least one of the bearings being arranged to surround the shaft, wherein the rotor shaft is fitted with the bearings to rotate relative to the shaft.

In this case, the rotor shaft may be formed in a cylindrical shape in close contact with outer rings of the bearings, and include a diaphragm portion which extends toward the shaft and is interposed between the bearings.

In this case, the bearing portion may include first and second bearings which are arranged side by side in the vertical direction and fixed to the shaft, and wherein the rotor shaft may be formed to be in close contact with outer rings of the first and second bearings, and the diaphragm portion may be interposed between the first and second bearings.

In this case, the housing may have an insertion hole formed on one side such that the upper end of the shaft is inserted and fixed thereto.

In this case, the housing may have a pressing member formed on one side which protrudes downward so as to press an inner ring of the first bearing.

In this case, the housing and the circuit board may be closely fixed by ultrasonic welding.

In this case, the housing may be formed with a concave space such that the rotor shaft, second magnet and second yoke are accommodated therein, and provided with a support member in surface contact with at least a part of the circuit board outside the concave space so as to support the circuit board, and wherein the support member may be provided with at least one protrusion that is formed to protrude upward, and the circuit board may have a through-hole which is formed at a position corresponding to the at least one protrusion so as to allow the protrusion to pass therethrough.

In this case, the vibration motor may further include a bottom portion formed in the shape of a plate, and placed and fixed to a lower case of the housing, wherein the bottom portion may be formed with a fixing member that protrudes upward at a predetermined height such that the lower end of the shaft is inserted and fixed therein.

In this case, an upper case of the housing may be provided with a first coupling portion which has a curved shape on at least a part of an outer edge, wherein a lower case of the housing may be provided with a second coupling portion which is formed in a shape corresponding to the first coupling portion so as to engage with the first coupling portion, and wherein the first coupling portion and the second coupling portion may be coupled to each other by ultrasonic welding.

In this case, the shaft may be fixed only to a lower case side of the housing, wherein the rotor shaft may include a rod portion which is disposed coaxially with the shaft and formed in a rod shape; and a cylindrical portion which is disposed at a lower part of the rod portion and provided with a space inside where the shaft is located, and wherein the bearing portion may include a first bearing in which an inner ring is fixed by being coupled to the rod portion and an outer ring is fixed in close contact with an upper case of the housing; and a second bearing in which an inner ring is fixed by being coupled to the shaft and an outer ring is in close contact with the cylindrical portion and fixed thereto.

Advantageous Effects

The vibration motor according to the exemplary embodiment of the present invention may firmly support the rotation of a rotor shaft and a rotating portion by fixing the shaft to one position so as not to rotate within the housing. Accordingly, the vibration motor according to an exemplary embodiment of the present invention can effectively suppress movement of the rotor shaft and the rotating portion in the axial or radial direction, thereby maintaining a constant distance between the magnet and the circuit board.

Further, in the vibration motor according to an exemplary embodiment of the present invention, the arrangement of a separate bearing for supporting the rotor shaft on the upper or lower side of the rotor shaft can be omitted such that the vibration motor can be made thinner.

In addition, the vibration motor according to an exemplary embodiment of the present invention may secure waterproof/dustproof performance by coupling the upper and lower cases of the housing to each other through an ultrasonic welding process.

In addition, the vibration motor according to an exemplary embodiment of the present invention can more stably maintain the distance between the magnet and the circuit board by closely fixing the circuit board to the housing through an ultrasonic welding process.

DETAILED DESCRIPTION OF THE EMBODIMENTS

Figure 1:
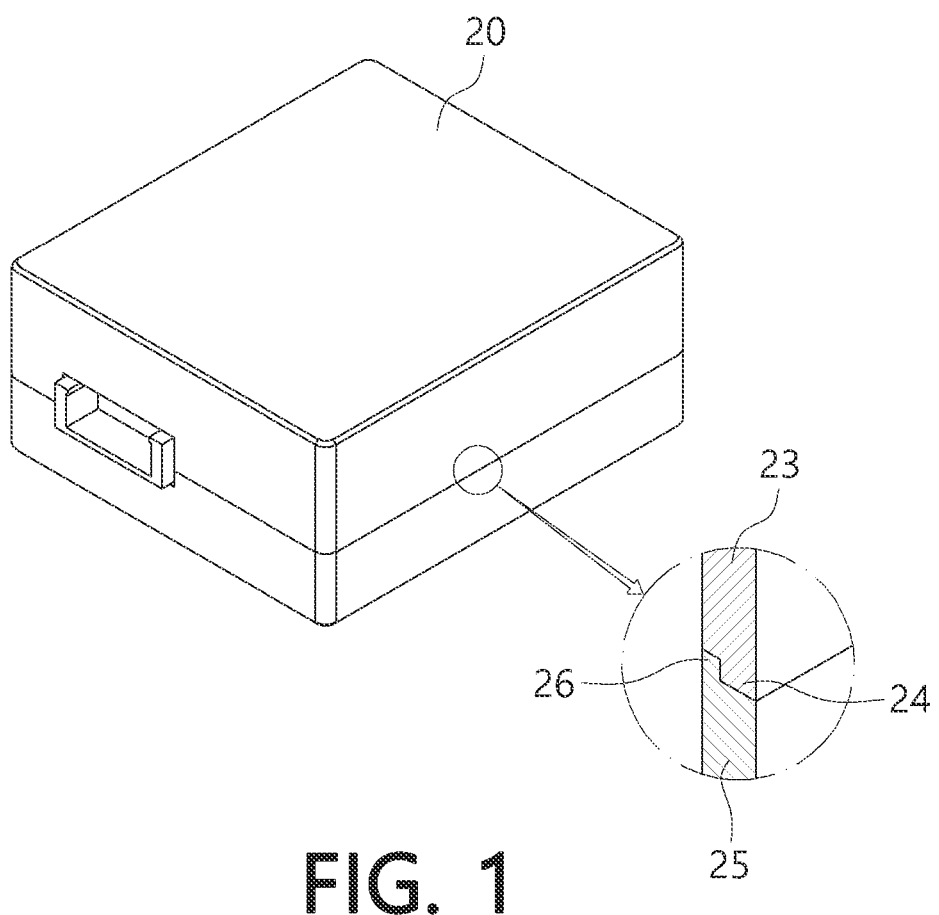
FIG. 1 is a perspective view illustrating a vibration motor according to an exemplary embodiment of the present invention.

Hereinafter, with reference to the accompanying drawings, the exemplary embodiments of the present invention will be described in detail so that a person skilled in the art can easily practice the present invention. The present invention may be embodied in many different forms and is not limited to the exemplary embodiments set forth herein. In order to clearly describe the present invention in the drawings, parts that are irrelevant to the description are omitted, and the same reference numerals are added to the same or similar components throughout the specification. In addition, the size or shape of the components shown in the drawings may be exaggerated for the clarity and convenience of description.

Figure 2:
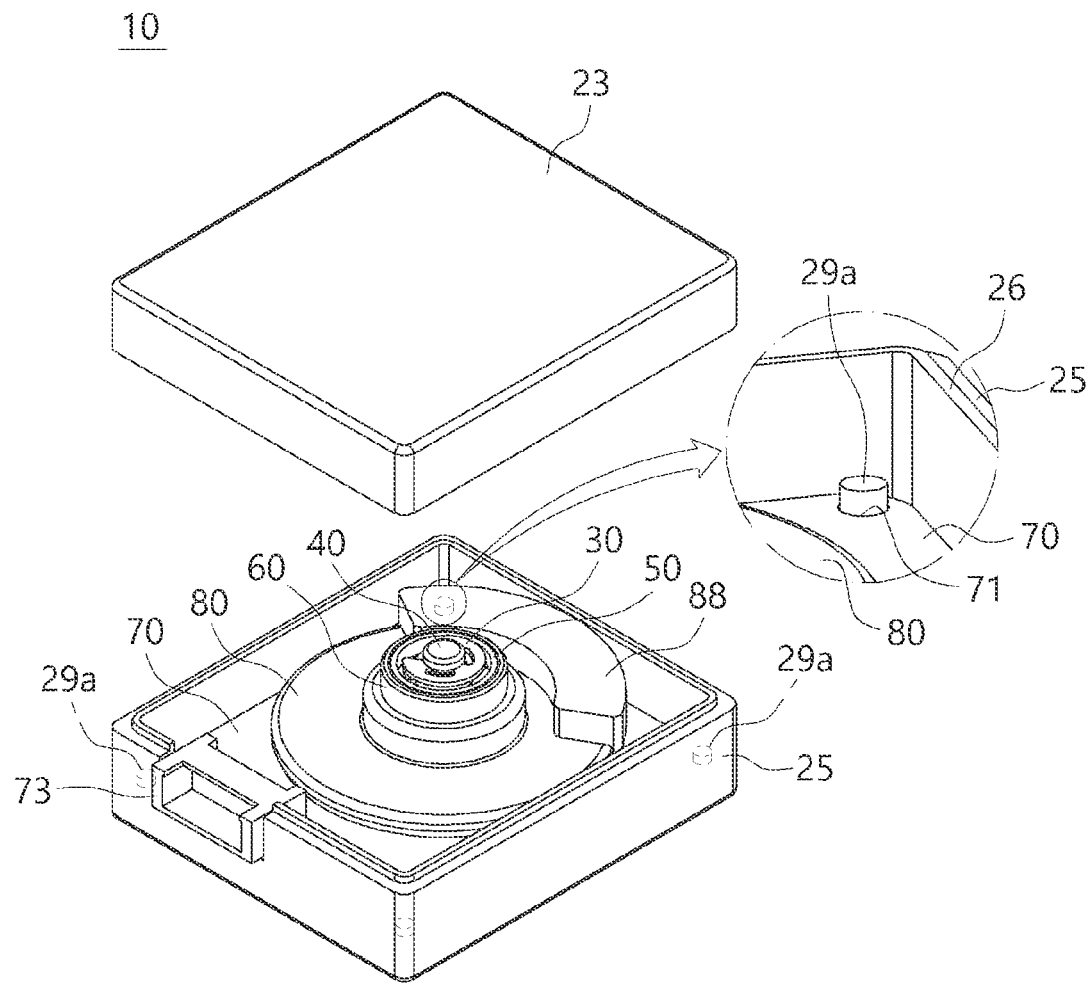
FIG. 2 is a perspective view showing the inside of a housing after separating the upper case of the housing in FIG. 1.
Figure 3:
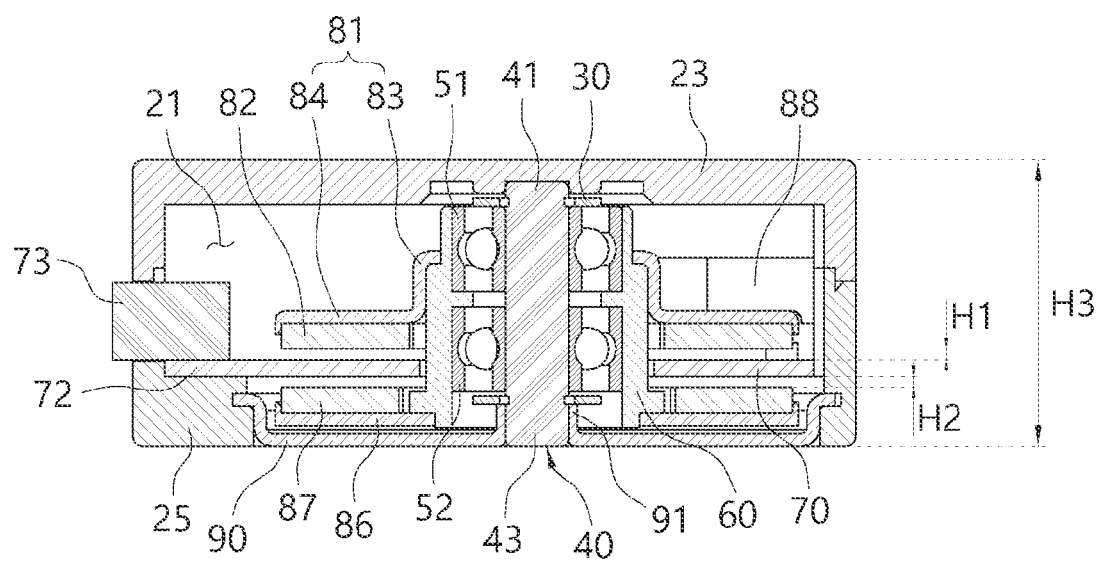
FIG. 3 is a cross-sectional view illustrating a cross-section of the vibration motor of FIG. 1.
Figure 4:
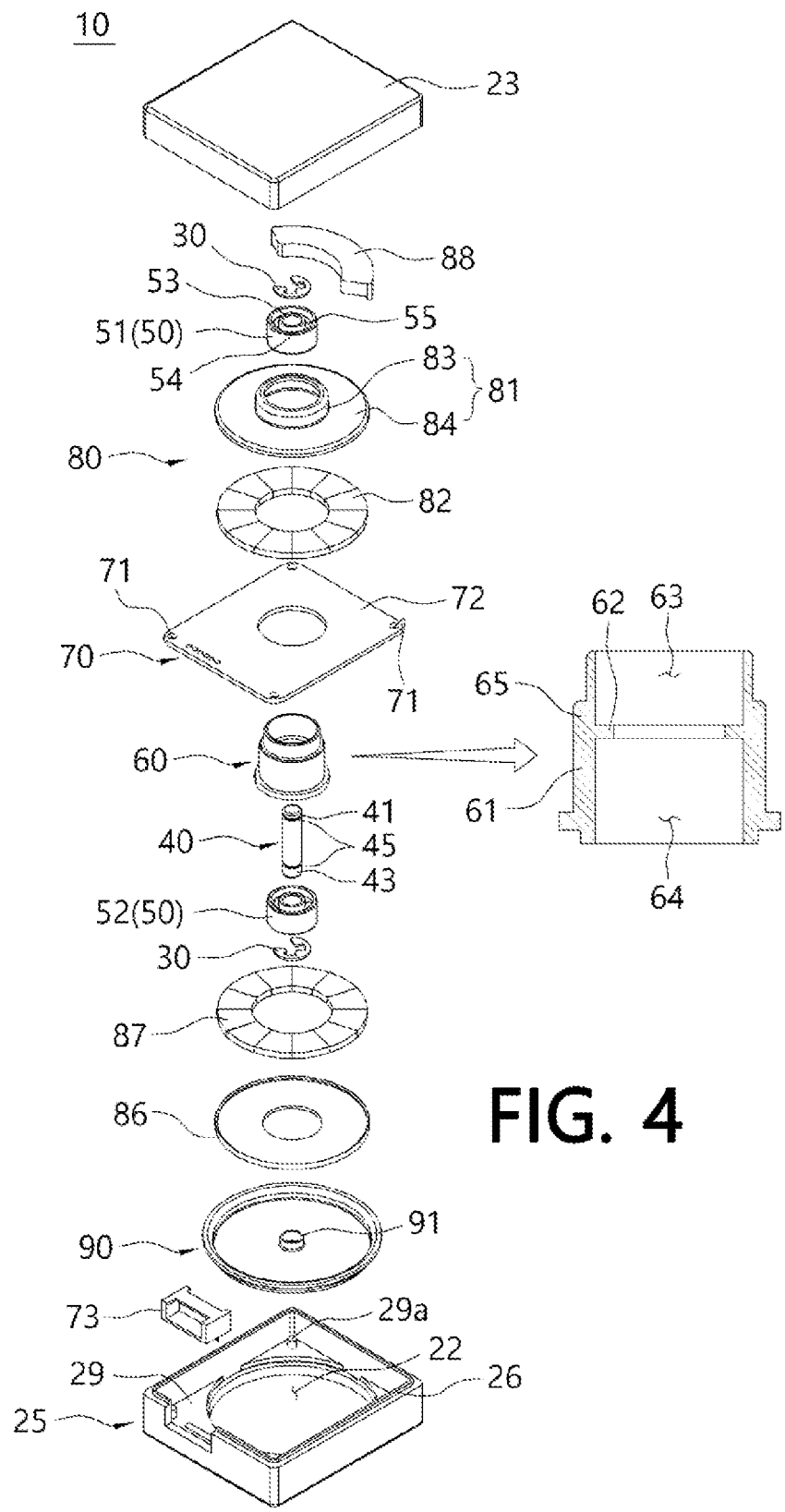
FIG. 4 is an exploded perspective view illustrating each component of the vibration motor of FIG. 1 in isolation.
Figure 5:
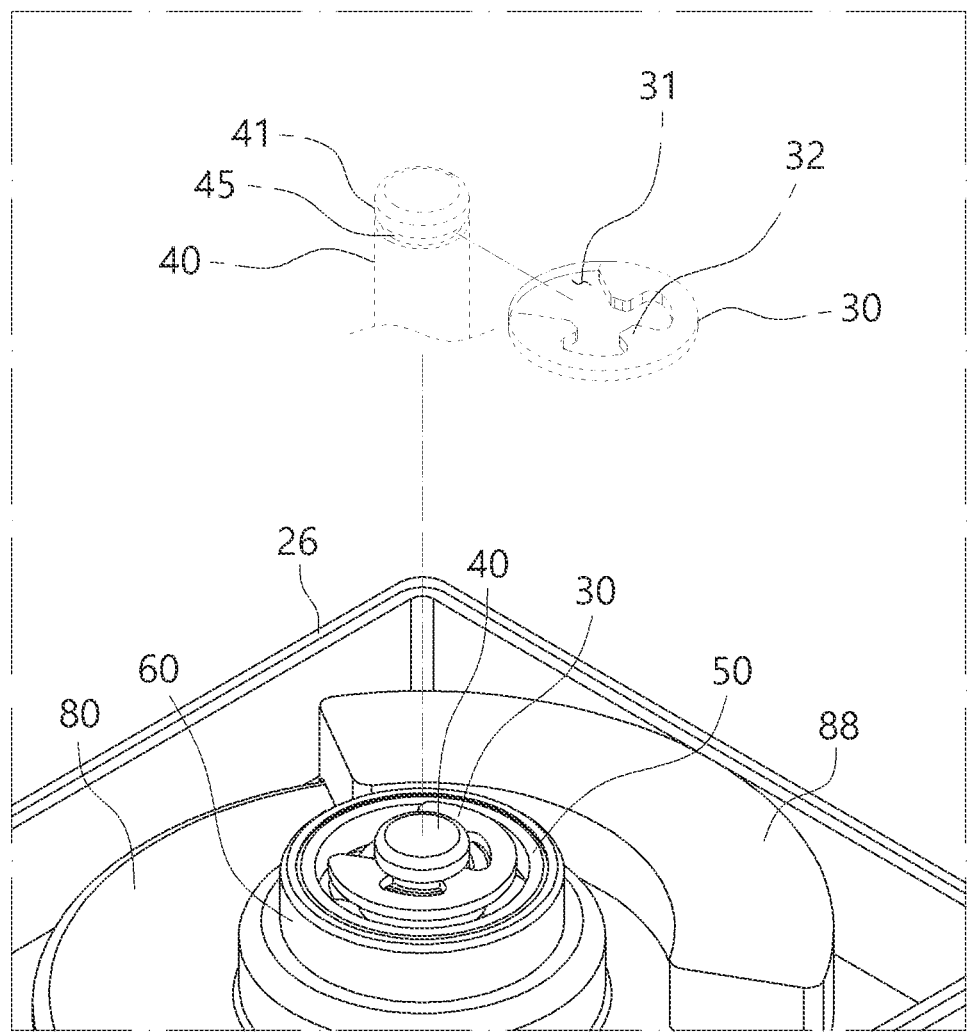
FIG. 5 is an enlarged perspective view showing an enlarged part of FIG. 2.
Figure 6:
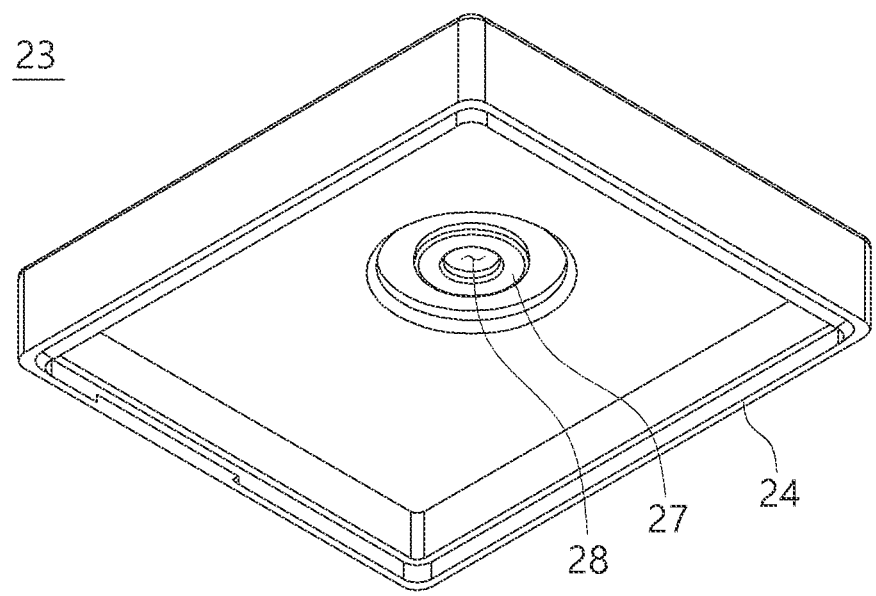
FIG. 6 is a perspective view of the bottom surface of the upper case of FIG. 1.

FIG. 1 is a perspective view illustrating a vibration motor according to an exemplary embodiment of the present invention, and FIG. 2 is a perspective view showing the inside of a housing after separating the upper case of the housing in FIG. 1. In addition, FIG. 3 is a cross-sectional view illustrating a cross-section of the vibration motor of FIG. 1, and FIG. 4 is an exploded perspective view illustrating each component of the vibration motor of FIG. 1 in isolation. In addition, FIG. 5 is an enlarged perspective view showing an enlarged part of FIG. 2, and FIG. 6 is a perspective view of the bottom surface of the upper case of FIG. 1.

For example, the vibration motor 10 according to an exemplary embodiment of the present invention is inserted into a chair, seat, backrest, cushion member and the like that are provided in a vehicle to provide a vibration force to the user, thereby delivering information related to vehicle operation or performing a function of pressurizing the user's body for massage. However, the application of the vibration motor 10 according to an exemplary embodiment of the present invention is not limited to the above-mentioned electric components for vehicles, and it is noted that it may be embedded in various household items such as mobile devices such as mobile phones, office chairs or massagers, so as to perform a function of providing alarms, warnings or massage.

To this end, the vibration motor 10 according to an exemplary embodiment of the present invention may include a housing 20, a shaft 40, a bearing portion 50, a rotor shaft 60, a circuit board 70 and a rotating portion 80, as illustrated in FIGS. 1 to 4.

First of all, the housing 20 forms the outer shape of the vibration motor 10 according to an exemplary embodiment of the present invention, and it may include an upper case 23 and a lower case 25, as illustrated in FIG. 2.

In this case, the upper case 23 and the lower case 25 may be coupled to each other to form a housing 20 having a housing shape, as illustrated in FIG. 1. In this way, an internal space 21 that is sufficient to accommodate various configurations to be described below may be formed inside the housing 20 in which the upper case 23 and the lower case 25 are combined.

In this case, on one side of a portion forming the inner space 21 of the upper case 23, a pressing member 27 and an insertion hole 28 may be provided to fix the shaft 40 to be described below and to restrain the movement of the bearing portion 50 in the axial direction. This will be described in more detail after the descriptions of the shaft 40 and the bearing portion 50 are completed.

In an exemplary embodiment of the present invention, referring again to FIG. 1, the upper case 23 and the lower case 25 may be respectively provided with a first coupling portion 24 and a second coupling portion 26 that are in contact with each other when coupled.

In this case, the first coupling portion 24 and the second coupling portion 26 may be formed on the outer rim of each case 23, 25, and as illustrated in the drawings, they may be formed in a curved shape and also may be formed in corresponding shapes so as to be engaged with each other. As such, the curved parts of the first coupling portion 24 and the second coupling portion 26 may function as welding mounts, when they are bonded to each other by ultrasonic welding Herein, ultrasonic welding refers to a known process of applying a wave having a high frequency to an object that is formed of a thermoplastic resin to melt and attach the object, and the detailed description thereof will be omitted.

In this regard, as illustrated in FIG. 1, the first coupling portion 24 and the second coupling portion 26 are respectively formed in a stepwise structure having a predetermined step and meshed together, thereby minimizing the external exposure of uneven rough parts (burrs) generated during the ultrasonic welding process.

As described above, in the vibration motor 10 according to an exemplary embodiment of the present invention, the upper case 23 and the lower case 25 are integrated with each other through an ultrasonic welding process such that it is possible to effectively form an airtight state in the inner space 21 of the housing 20 where the main components are embedded. As a result, the vibration motor 10 according to an exemplary embodiment of the present invention may secure sufficient durability even in a rather harsh environment such as underwater or construction sites.

Meanwhile, as described above, the bonding of the upper case 23 and the lower case 25 to each other through the ultrasonic welding process is only an exemplary embodiment of the present invention, and in addition to the above, they may be combined through bonding by a third adhesive material, a bolting process or the like.

In an exemplary embodiment of the present invention, referring to FIG. 4, the lower case 25 may be provided with a concave space 22 which is formed concavely in a direction when a part of the rotating portion 80 to be described below is accommodated therein.

Figure 7:
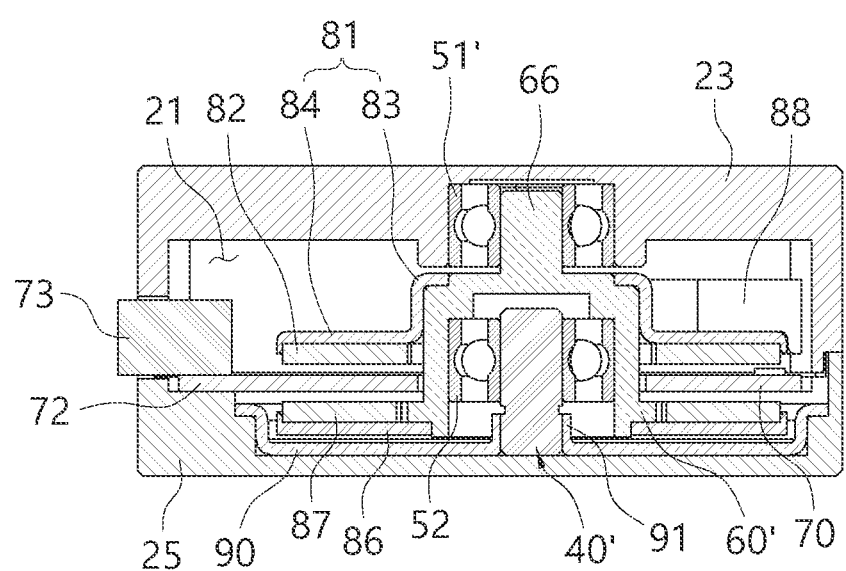
FIG. 7 is a cross-sectional view showing the cross-section of a vibration motor according to another exemplary embodiment of the present invention.

As illustrated in FIG. 3, the concave space 22 may be formed in a form where the lower part is open to the outside, or may be formed in a form of being closed by the bottom part of the lower case 25, as illustrated in FIG. 7. In this regard, when the lower part of the concave space 22 is formed to be opened as illustrated in FIG. 3, a bottom portion 90, which is a separate member, is disposed on the lower case 25 so as to close the lower part of the concave space 22, thereby preventing the internal configurations of the housing 20, including the rotor shaft 60, from being exposed to the outside of the housing 20. In this regard, supplementary explanation will be provided through explanation related to the bottom portion 90.

In addition, a support member 29 may be provided outside the concave space 22 so as to support the circuit board 70 which is formed in the shape of a plate and form a state of surface contact with a part of the circuit board 70.

In this case, the support member 29 may be a part extending in a direction parallel to the circuit board 70 with a predetermined step from the bottom of the concave space 22. As an illustrative example, as illustrated in FIG. 4, a total of 4 support members 29 may be formed at positions corresponding to 4 vertices of the circuit board 70. Through this, the support member 29 may stably support the circuit board 70 without being deflected in any one direction.

In addition, referring to FIGS. 2 and 4, the support member 29 may have a protrusion 29a protruding upward on an upper surface thereof. In connection with the process of fixing the circuit board 70 to the inner space 21 of the housing 20, the protrusion 29a is intended to primarily align the position of the circuit board 70 before a gap between the housing 20 and the circuit board 70 is welded or bonded.

More specifically, a through-hole 71 having a size corresponding to the cross-section of the protrusion 29a may be formed at a position of the circuit board 70 corresponding to the protrusion 29a of the support member 29. Accordingly, when the circuit board 70 is disposed on the support member 29, the protrusion 29a passes through the through-hole 71 such that the circuit board 70 can be temporarily fixed so as not to move. Through this, the position of the circuit board 70 may be prevented from being moved during the bonding or welding process between the support member 29 and the circuit board 70 such that it is possible to perform a stable bonding or welding process.

Meanwhile, as a non-limiting example, in a state where the circuit board 70 is placed in contact with the support member 29 as described above, the support member 29 and the circuit board 70 may be adhered and fixed by an ultrasonic welding process. In this case, the above-described protrusion 29a may function as a welding mount and may be partially melted, and as a result, strong adhesive strength may be easily secured without applying a separate adhesive to the support member 29 or the circuit board 70 side.

In this way, when the circuit board 70 is tightly fixed within the housing 20 through welding or the like, the movement of the circuit board 70 in a plane direction or an axial direction may be effectively restricted. In particular, when the housing 20 and the circuit board 70 are fixed through a bolting process, the circuit board 70 may bend and deform along the axial direction (crying phenomenon) due to repeated vibration of the vibration motor 10, and it is possible to minimize this problem when the vibration motor 10 according to an exemplary embodiment of the present invention is applied. Accordingly, the circuit board 70 may always maintain a constant distance H1, H2 from the magnets 82, 87, which will be described below.

The vibration motor 10 according to an exemplary embodiment of the present invention may include a shaft 40 which is disposed upright in the inner space 21.

In an exemplary embodiment of the present invention, the shaft 40 may function as a rotation shaft when rotating the rotating portion 80 to be described below. That is, the shaft 40 may support the axial rotation of the rotating portion 80 via the bearing portion 50.

In this case, the shaft 40 may be fixed so as not to rotate within the inner space 21. As a specific example, the shaft 40 may have an upper end 41 fixed to the upper case 23 and a lower end 43 fixed to the lower case 25, as illustrated in FIG. 3. In this case, the meaning that the shaft 40 is fixed to the cases 23, 25 means that it is disposed in a state where movement or rotation is impossible within the inner space 21, and for example, it may include all of cases where it is directly contacted and fixed to the cases 23, 25, similar to the upper portion 41 of the shaft, and cases where it is indirectly fixed on the cases 23, 25 through a separate member such as the bottom portion 90.

As such, compared to the shaft of the related art described above, the shaft 40 of the vibration motor 10 according to an exemplary embodiment of the present invention may firmly support the rotation of the rotating portion 80 in a state of being fixed at one position without rotating. Through this, the shaft 40 may suppress the movement of each configuration of the rotating portion 80 in the axial direction or the radial direction of the shaft 40. In addition, the vibration motor 10 according to an exemplary embodiment of the present invention may maintain a constant distance between the circuit board 70 and the magnets 82, 87, in spite of a somewhat violent vibration motion. As a result, it is possible to secure durability of the vibration motor 10 by preventing accidents such as the coil 72 on the circuit board 70 and the magnets 82, 87 being in contact with each other and being damaged.

In addition, since the shaft 40 is coupled to the bearings 51, 52 and maintained in a fixed state, the deterioration of durability due to fretting corrosion between the shaft 40 and the bearings 51, 52 as in the related art may be completely prevented, and the heat treatment process on the surface of the shaft 40 may be omitted.

The vibration motor 10 according to an exemplary embodiment of the present invention may include a bearing portion 50 which is disposed coaxially with the shaft 40 to support rotation of the rotor shaft 60 with respect to the shaft 40. In this case, the bearing portion 50 may include a plurality of known ball bearings including an inner ring 53, an outer ring 54 and a ball 55.

As a specific example, referring to FIG. 3, the bearing portion 50 may include a first bearing 51 and a second bearing 52 that are disposed side by side in the vertical direction and are both fixed to the shaft 40. In this case, the inner rings 53 of the first bearing 51 and the second bearing 52 may be fitted and coupled to the shaft 40 such that the rotor shaft 60 does not rotate and remains stationary even when the rotor shaft 60 rotates. On the other hand, the outer ring 54 may be fitted into a cylindrical portion 61 of the rotor shaft 60 and rotate along with the rotation of the rotor shaft 60. That is, the first bearing 51 and the second bearing 52 may function as a rotation medium to allow rotation of the rotor shaft 60 with respect to the shaft 40 which is fixed so as not to rotate.

As described above, the vibration motor 10 according to an exemplary embodiment of the present invention is advantageous in terms of the manufacturing process by simplifying the structure of the bearing portion 50 by arranging a plurality of bearings 51, 52 to be coaxially coupled to the shaft 40 in common. In addition, the vibration motor 10 according to an exemplary embodiment of the present invention does not need to dispose a separate bearing for supporting the rotor shaft 60 on the upper or lower side of the rotor shaft 60, compared to the related art, such that the thickness H3 of the vibration motor 10 can be minimized, and thus, the thickness of the vibration motor 10 may be reduced.

Meanwhile, in an exemplary embodiment of the present invention, as illustrated in the drawings, arranging the first bearing 51 and the second bearing 52 side by side in the vertical direction is to minimize a phenomenon in which the rotor shaft 60 connected to the bearing is tilted with respect to the shaft 40 due to a clearance that is inherent in a single bearing, or rotational deflection of the bearing portion 50. That is, the vibration motor 10 according to an exemplary embodiment of the present invention may cancel out a clearance that is inherent in each of the first bearing 51 and the second bearing 52 by arranging the first bearing 51 and the second bearing 52 in parallel along the shaft 40, and through this, it is possible to minimize the impact of clearance due to the ball bearing's own structure. In this regard, it is illustrated in the drawings that the bearing portion 50 includes two bearings 51, 52, but the example of the bearing portion 50 is not limited thereto, and it is noted that three or more bearings may be included to minimize the above-mentioned clearance.

Next, the vibration motor 10 according to an exemplary embodiment of the present invention may include a rotor shaft 60 which is arranged to be rotatable with respect to the shaft 40 via the bearing portion 50 described above. As described above, the rotor shaft 60 is fitted with the plurality of bearings 51, 52 constituting the bearing portion 50 so as to integrally rotate with the inner ring 53 or the outer ring 54 of the bearings 51, 52.

As an illustrative example, referring again to FIGS. 3 and 4, the rotor shaft 60 may be formed in a cylindrical structure by including a cylindrical portion 61 so as to be in close contact with the outer rings of the first bearing 51 and the second bearing 52 that are disposed vertically.

In this case, the inside of the cylindrical portion 61 is provided with a diaphragm portion 62 extending from the cylindrical portion 61 toward the shaft 40 and interposed between the first bearing 51 and the second bearing 52, so as to separate the bearings 51, 52 from each other. The inner space of the cylindrical portion 61 may be divided into a first space 63 into which the first bearing 51 is inserted through the diaphragm portion 62 and a second space 64 into which the second bearing 52 is inserted.

As described above, the vibration motor 10 according to an exemplary embodiment of the present invention introduces a diaphragm portion 62 that is unique to the rotor shaft 60 to separate the first bearing 51 and the second bearing 52 from each other, thereby preventing the rotor shaft 60 from moving along the extending direction of the shaft 40. That is, as the diaphragm portion 62, which is a part of the rotor shaft 60, is disposed in the form of being sandwiched between the plurality of bearings 51, 52, the axial movement of the diaphragm portion 62 as well as the cylindrical portion 61 connected thereto may be restricted. As a result, the distances H1, H2 between the magnets 82, 87 that are fixed to the rotor shaft 60 and the circuit board 70 disposed between the plurality of magnets 82, 87 may be maintained to be constant.

Meanwhile, it is illustrated in the drawings that the first bearing 51 and the second bearing 52 have the same specifications, and accordingly, the first space 63 and the second space 64 have the same radius, but depending on the specifications of the provided bearings, the radii of the first space 63 and the second space 64 may be formed to be different from each other.

In an exemplary embodiment of the present invention, the rotor shaft 60 may further include a uneven portion 65 in addition to the cylindrical portion 61 and the diaphragm portion 62.

In this case, as illustrated in FIG. 4, the uneven portion 65 may be a part protruding a predetermined length from a part of the outer circumferential surface of the rotor shaft 60 in a radial direction to form a step. In this regard, the fixing portion 83 of the yokes 81, 86 to be described below may partially include a bent or curved shape in a shape corresponding to the concave-convex part 65. Through this, the uneven portion 65 of the rotor shaft 60 and the fixing portion 83 of the yokes 81, 86 may be more stably coupled by including a stepped or bent (curved) part and being fitted together.

Next, the vibration motor 10 according to an exemplary embodiment of the present invention may include a rotating portion 80 which is integrally rotated with the rotor shaft 60 described above. In this case, the rotating portion 80 may include a first yoke 81, a first magnet 82, a second yoke 86 and a second magnet 87.

First of all, as illustrated in FIG. 4, a first yoke 81 may be formed in a disk shape including a hollow such that the rotor shaft 60 passes therein. In this case, the first yoke 81 may be coupled to and fixed to one side of the rotor shaft 60, and accordingly, it may not be separated from the rotor shaft 60 even during rotation.

As a more specific example, referring to FIGS. 3 and 4, the first yoke 81 is formed by including a fixing portion 83 which is formed to protrude at a predetermined height toward the upper side along the hollow of an accommodating portion 84 and the first yoke 81 formed in a disk shape. In this case, the first magnet 82 to be described below may be accommodated in the accommodating portion 84 and disposed in a radial structure, and the fixing portion 83 may couple the first yoke 81 to the rotor shaft 60 by forming a fitting fit with the outer peripheral surface including the uneven part 65 of the rotor shaft 60.

The first magnet 82 may be accommodated in the first yoke 81. As illustrated in FIG. 4, the first magnet 82 may be attached to the accommodating portion 84 of the first yoke 81 in a torus shape that is magnetized with multi-poles.

In this case, the first magnet 82 includes a coil 72 and may be disposed to face the circuit board 70 that is disposed below. In this case, the first magnet 82 and the coil 72 on the circuit board 70 may be spaced apart from each other while forming predetermined intervals H1, H2. Through this, when power is applied to the coil 72, the electromagnetic force induced in the coil 72 and the magnetic force of the first magnet 82 may interact, and as a result, the first yoke 81 and the rotor shaft 60 may rotate with respect to the shaft 40 via the bearing portion 50.

Meanwhile, the rotating portion 80 may include a second yoke 86 and a second magnet 87. In this case, the second yoke 86 and the second magnet 87 differ only in that they are symmetrically disposed with the first yoke 81 and the first magnet 82 around the circuit board 70, and since their functions, structures and arrangement relationships with the circuit board 70 are generally similar, the descriptions thereof will be replaced with the descriptions of the first yoke 81 and the first magnet 82.

In an exemplary embodiment of the present invention, a circuit board 70 formed in a plate shape may be disposed between the first magnet 82 and the second magnet 87.

In this case, a hollow may be formed inside the plate-shaped circuit board 70 such that the rotor shaft 60 passes therethrough, and a coil 72 may be disposed around the hollow to allow current to flow.

In this regard, a coil 72 in which a linear conductive member is wound in a gradually reduced diameter may be disposed on the circuit board 70, or a patterned coil 72 may be disposed on the circuit board 70. When current flows through the coil 72, the above-described electromagnetic force is induced such that the rotating portion 80 including the first magnet 82 and the second magnet 87 can be rotated together with the rotor shaft 60.

In this case, as described above, the circuit board 70 may be fixed to the support member 29 of the lower case 25 through an ultrasonic fusion process, and to this end, a through-hole 71 may be formed in the circuit board 70 through which the protrusion 29a of the support member 29 passes.

Meanwhile, the circuit board 70 may receive power from the outside through a connector 73 that is disposed on one side of the housing 20. In this case, the connector 73 may be formed of a known waterproof connector to maintain an airtight state formed between the upper case 23 and the lower case 25. In addition, the connector may implement a completely waterproof structure by directly soldering a lead wire to the circuit board 70 and then forming the same in the form of epoxy molding, as necessary.

In an exemplary embodiment of the present invention, as illustrated in FIG. 2, at least one of the first yoke 81 or the second yoke 86 may be installed with a weight body 88 for inducing eccentric rotation of the rotating portion 80.

In this case, the weight body 88 may provide a biased centrifugal force in the rotational radial direction with respect to the rotating portion 80 during rotation by having a predetermined weight. In this case, the direction of the biased centrifugal force provided by the weight body 88 varies every moment according to rotation, and as a result, eccentric rotation may be induced by the rotor shaft 60 and the rotating portion 80. Through this, the vibration motor 10 according to an exemplary embodiment of the present invention may vibrate.

In addition, the vibration motor 10 according to an exemplary embodiment of the present invention may include a snap ring 30 for more effectively limiting the movement of the bearing portion 50 in the axial direction.

Specifically, as illustrated in FIG. 2, the snap ring 30 is adjacent to the bearing portion 50 in the inner space 21, but may be disposed in a form where a part thereof is coupled to the shaft 40. In addition, the snap ring 30 has a predetermined area in a direction perpendicular to the extending direction of the shaft 40, thereby effectively limiting the axial movement of the bearing portion 50 adjacent thereto.

As an illustrative example of the snap ring 30, referring to FIG. 5, the snap ring 30 may be formed in a structure where one side thereof is open by including an open portion 31. In this case, the snap ring 30 may be inserted into an insertion groove 45 formed in the shaft 40, by including a protruding portion 32 protruding toward the shaft 40. That is, the snap ring 30 may enter close to the shaft 40 side through the open portion 31, and is inserted into the insertion groove 45 through the protruding portion 32 and fixed such that even if the bearing unit 50 presses the snap ring 30 during rotation, axial movement may be limited. However, the snap ring 30 described above is not an essential member, and it may be omitted if the axial movement of the bearing portion 50 is already effectively suppressed.

Meanwhile, the vibration motor 10 according to an exemplary embodiment of the present invention may introduce a unique structure on the upper case 23 side, in addition to the snap ring 30 described above to limit the axial movement of the rotor shaft 60 and the rotating portion 80.

More specifically, referring to FIG. 6, the upper case 23 may include a pressing member 27 in close contact with the first bearing 51 at one side adjacent to the bearing portion 50.

In this case, the pressing member 27 may be formed in a torus shape protruding from one surface of the upper case 23 so as to press only the inner ring 53 of the first bearing 51. In this case, the pressing member 27 is formed to have a radius larger than the inner ring 53 of the first bearing 51 and smaller than the outer ring 54 such that the axial movement of the inner ring 53 fixed to the shaft 40 may be restricted, but the rotation of the outer ring 54 may not be affected.

In this case, when the snap ring 30 is present on one side of the bearing portion 50, as shown in FIG. 3, the pressing member 27 is in close contact with the snap ring 30 and presses the snap ring 30, thereby indirectly restricting the axial movement of the bearing portion 50. In addition, although not illustrated in the drawings, when the snap ring 30 is absent, it is directly in close contact with the bearing portion 50 to limit the axial movement of the bearing portion 50.

Meanwhile, an insertion hole 28 may be formed inside the pressing member 27 such that an upper end 41 of the shaft 40 is inserted and fixed thereto. In this case, the insertion hole 28 may have the same diameter as the upper end 41 of the shaft 40 in order to form a fitting coupling with the shaft 40. Preferably, as illustrated in FIG. 3, the ceiling surface in the insertion hole 28 and the upper end 41 of the shaft 40 come into contact with each other such that the shaft 40 can be more firmly fixed.

In an exemplary embodiment of the present invention, the above-mentioned shaft 40, bearing portion 50, circuit board 70 and rotating portion 80 may be pre-assembled outside the housing 20 and placed on the lower case 25. That is, as illustrated in FIG. 4, the shaft 40, the bearing portion 50, the circuit board 70 and the rotating portion 80 may be sequentially disposed on the bottom portion 90 formed in a plate shape. Since the vibration motor 10 according to an exemplary embodiment of the present invention through the bottom portion 90 may pre-assemble some components separately from the housing 20, it is possible to improve manufacturability and productivity.

More specifically, the bottom portion 90 may include a fixing member 91 which is formed to protrude upward at a predetermined height such that the lower end 43 of the shaft 40 can be inserted into the center and fixed thereto. In this case, the fixing member 91 has a hollow corresponding to the diameter of the shaft 40 formed therein, and is fitted with the lower end 43 of the shaft such that the shaft 40 can be stably fixed inside the inner space 21 of the housing 20.

In this case, the bottom portion 90 may be formed of, for example, a steel material in order to sufficiently secure a press-fitting fixing force when the shaft 40 is press-fitted and fixed, and to prevent external shock and thermal deformation.

Hereinafter, the vibration motor 10' according to another exemplary embodiment of the present invention will be described with reference to the drawings. In this regard, FIG. 7 is a cross-sectional view illustrating the cross-section of a vibration motor according to another exemplary embodiment of the present invention.

The vibration motor 10' according to another exemplary embodiment of the present invention generally includes a structure identical to or similar to that of the above-described exemplary embodiment 10, except that the structures of the shaft 40' and the rotor shaft 60', or only part of the structure of the bearing portion coupled thereto may be changed. Therefore, in the following description, the description will focus on differences compared to the above-described exemplary embodiment 10.

Specifically, referring to FIG. 7, in the case of the vibration motor 10' according to another exemplary embodiment of the present invention, the shaft 40' may be fixed only to the lower case 25 side. In this case, the lower end of the shaft may be fixed in direct contact with the housing 20 or indirectly fixed through the bottom portion 90.

Further, in the vibration motor 10' according to another exemplary embodiment of the present invention, the rotor shaft 60' may further include a rod portion 66 which is disposed on the upper part of a cylindrical portion 61 and formed in a rod shape, in addition to the cylindrical portion 61 for accommodating the second bearing 52 therein. This rod portion 66 may be disposed coaxially with the shaft 40.

In this case, the first bearing 51' located at the upper part among a plurality of bearings constituting the bearing portion 50 may be coupled to and fixed to the above-described rod portion 66. In the case of the second bearing 52, it may be disposed in a space within the cylindrical portion 61 in a fixedly coupled state with the shaft 40, similar to the above-described exemplary embodiment. In other words, the first bearing 51' is disposed outside the rotor shaft 60 such that the outer ring 54 is fixed, and the inner ring 53 can rotate together with the rod portion 66, whereas the second bearing 52 is disposed inside the rotor shaft 60 such that the inner ring 53 is fixed by the shaft 40, and the outer ring 54 can be rotated together with the rod portion 66 of the rotor shaft 60.

In this case, the upper case 23 may have a space at one side into which the first bearing 51' can be inserted so as to fix and support the outer ring of the first bearing 51'. In this case, the space of the upper case 23 is in close contact with the outer ring of the first bearing 51' such that the outer ring is fixed so as not to rotate even when the rotor shaft 60 rotates.

As such, when the vibration motor 10 according to another exemplary embodiment of the present invention is applied, the size of the first bearing 51' is not limited by the rotor shaft 60 compared to the above-described exemplary embodiment, and thus, there is an advantage that the inner diameter or outer diameter of the first bearing 51' may be further expanded. In this way, when the specifications of the first bearing 51' are expanded, heat generated by long-term vibration of the high-vibration motor may be further reduced, and there is an advantage that sufficient durability may be secured against the vibration load applied to the bearing when vibration occurs.

In addition, as shown in the above-described embodiment, the shaft 40 performing the rotation axis function is stably fixed in the housing 20 such that the rotor shaft 60 and the rotating portion 80 can be firmly supported, and the tilting phenomenon of the rotor shaft 60 can also be effectively restrained through the first bearing 51' on the upper side. Accordingly, the distances H1, H2 between the magnets 82, 87 and the circuit board 70 may always be maintained to be constant.

Although one exemplary embodiment of the present invention has been described above, the spirit of the present invention is not limited to the exemplary embodiments presented herein, and those skilled in the art who understand the spirit of the present invention may easily suggest other exemplary embodiments by changing, modifying, deleting or adding components within the scope of the same spirit, but this will also fall within the scope of the present invention.

What is claimed is:

1. A vibration motor, comprising:
   a rotor shaft;
   a first magnet and a second magnet arranged on the rotor shaft to face each other;
   a circuit board, wherein the circuit board comprises a hollow hole, wherein the rotor shaft passes through the hollow hole, and coils arranged thereon, wherein the coils respectively face the first and second magnets;
   a housing, wherein the housing forms an inner space, the rotor shaft and the circuit board are mounted in the inner space, to fix the circuit board;
   a shaft passing through the rotor shaft and fixedly erected in the housing;
   a first yoke and a second yoke, wherein the first and second magnets are respectively installed on the first yoke and the second yoke, and the first yoke and the second yoke are fixedly coupled to the rotor shaft to integrally rotate along with the rotor shaft;
   a weight installed on the first yoke or the second yoke; and
   a bearing portion, wherein the bearing portion comprises a plurality of bearings coaxially arranged with the shaft, at least one of the plurality of bearings is arranged to surround the shaft,
   the rotor shaft is fitted with the plurality of bearings to rotate relative to the shaft, the rotor shaft comprises a cylindrical shape in close contact with outer rings of the plurality of bearings, and the rotor shaft comprises a diaphragm portion, wherein the diaphragm portion extends toward the shaft and is interposed between the plurality of bearings.

2. The vibration motor according to claim 1, wherein the bearing portion comprises first and second bearings, the first and second bearings are arranged side by side in vertical direction and fixed to the shaft, and wherein the rotor shaft is formed to be in close contact with outer rings of the first and second bearings, and the diaphragm portion is interposed between the first and second bearings.

3. The vibration motor according to claim 1, wherein the housing has an insertion hole formed on one side, wherein an upper end of the shaft is inserted and fixed thereto.

4. The vibration motor according to claim 1, wherein the housing has a pressing member formed on one side, wherein the pressing member protrudes downward to press an inner ring of a first bearing.

5. The vibration motor according to claim 1, wherein the housing and the circuit board are closely fixed by ultrasonic welding.

6. The vibration motor according to claim 1, wherein the housing is formed with a concave space, wherein the rotor shaft, second magnet and second yoke are accommodated therein, and the housing is provided with a support member in surface contact with at least a part of the circuit board outside the concave space to support the circuit board, and wherein the support member is provided with at least one protrusion, wherein the at least one protrusion is formed to protrude upward, and the circuit board has a through-hole, wherein the through-hole is formed at a position corresponding to the at least one protrusion to allow the at least one protrusion to pass therethrough.

7. The vibration motor according to claim 1, further comprising:

a bottom portion, wherein the bottom portion is formed in a shape of a plate, and placed and fixed to a lower case of the housing, wherein the bottom portion is formed with a fixing member, wherein the fixing member protrudes upward at a predetermined height, wherein a lower end of the shaft is inserted and fixed therein.

8. The vibration motor according to claim 1, wherein an upper case of the housing is provided with a first coupling portion, wherein the first coupling portion has a curved shape on at least a part of an outer edge, wherein a lower case of the housing is provided with a second coupling portion, wherein the second coupling portion is formed in a shape corresponding to the first coupling portion to engage with the first coupling portion, and wherein the first coupling portion and the second coupling portion are coupled to each other by ultrasonic welding.

9. The vibration motor according to claim 1, wherein the shaft is fixed only to a lower case side of the housing, wherein the rotor shaft comprises a rod portion, wherein the rod portion is disposed coaxially with the shaft and formed in a rod shape; and a cylindrical portion, wherein the cylindrical portion is disposed at a lower part of the rod portion and provided with a space inside where the shaft is located, and wherein the bearing portion comprises a first bearing, an inner ring is fixed in the first bearing by being coupled to the rod portion and an outer ring is fixed in close contact with an upper case of the housing; and a second bearing, wherein an inner ring is fixed in the second bearing by being coupled to the shaft and an outer ring is in close contact with the cylindrical portion and fixed thereto.

\* \* \* \* \*